Patented Nov. 22, 1938

2,137,746

UNITED STATES PATENT OFFICE 2,137,746

CHEWING GUM

Robert L. Wilson, Chicago, Ill., assignor to Wm. Wrigley, Jr., Company, Chicago, Ill., a corporation of Delaware No Drawing. Application June 27, 1938, Serial No. 216,063

13 Claims. (Cl. 99—135)

My invention relates to chewing gums and is concerned with the preparation of products having particularly satisfactory properties and characteristics.

In the preparation of chewing gums in accordance with prior art practice, gums, chicle and other latex gums, and resins and the like have been blended and mixed with the proper amounts of sugar, flavor and the like to produce products having desired chewability and similar characteristics. In order to achieve particular effects, it has been common to use oleaginous and waxy materials in the chewing gum mix as, for example, paraffin wax, spermaceti, ceresin wax, beeswax, candelilla wax, carnauba wax, stearine, petrolatum, cocoa butter, and the like. While the use of these materials brings about improvements in certain characteristics of the final chewing gum product, usually these improvements are obtained at a sacrifice of other desired properties. Thus, for example, while ordinary paraffin wax having a melting point of from about 110 degrees F. to a maximum of 149 degrees F. tends to impart desired smoothness to chewing gum mixes, it also possesses the undesirable feature of rendering the final chewing gum too plastic and, in addition, it imparts other objectionable properties to the chewing gum.

I have made the surprising discovery that paraffin waxes having a melting point ranging from a minimum of about 160 degrees F. and extending upwardly to about 185 degrees F. or slightly higher, particularly from about 168 degrees F. to about 180 degrees F., have the unusual and entirely unexpected property of not only imparting optimum smoothness and freedom from tack to chewing gum mixes but, in addition, leave the composition with the very desirable qualities of springiness and roundness, heretofore unobtainable with so-called smoothing ingredients utilized in chewing gum mixes made from bases containing guttas, latexes and gums such as jelutong, gutta K, gutta soh, gutta siak, ester gum, resins such as coumarone, dammar, mixtures thereof, and the like, as more fully set out hereinafter.

Ordinary paraffin waxes have a melting point, as indicated above, within the range of about 110 degrees F. to a maximum of about 149 degrees F., those which almost invariably have been utilized in chewing gum having a melting point of the order of 120 degrees F. to 130 degrees F. Paraffin wax having a melting point of at least 160 degrees F. and upwardly to about 180 degrees F. or somewhat higher represents a by-product of oil refining processes and is of relatively recent origin. After careful research, I have found, as previously stated, that this particular type of paraffin wax acts in an entirely unexpected manner in chewing gum.

In order that those skilled in the art may even more fully appreciate the scope of my invention, I list hereinbelow specific embodiments for carrying out the novel teachings of my invention. It will be understood that these embodiments are illustrative and in no wise limitative of the full scope of my invention. Thus, for example, different base mixtures of gums, guttas, rubbers, resins and the like may be utilized, the proportions thereof may vary, and the amounts of the paraffin wax are likewise variable within limits.

*Example I—Chewing gum base*

| | Percent |
|---|---|
| Jelutong (dry) | 92 |
| Paraffin wax (m. p. 168° F.) | 8 |

*Example II—Chewing gum base*

| | Percent |
|---|---|
| Ester gum | 30 |
| Coumarone resin | 45 |
| Latex (dry) | 15 |
| Paraffin wax (m. p. 180° F.) | 10 |

*Example III—Chewing gum base*

| | Percent |
|---|---|
| Jelutong (dry) | 80 |
| Gutta siak | 15 |
| Paraffin wax (m. p. 176° F.) | 5 |

The proportions of the special paraffin wax which I utilize herein are, as stated, subject to variation, but I prefer to employ from about 2.0% to 15.0% thereof, calculated on the weight of the dry finished chewing gum base, approximately 5% to 8% representing an optimum amount in most cases.

In order to make a chewing gum from the base material set forth above in the illustrative examples, I proceed in accordance with well known and established practice. Thus, for example, I prepare a chewing gum mix employing about 20% of the chewing gum base, about 60% of pulverized sugar (sucrose), about 19% commercial corn syrup, and about 1% of a desired flavor. It will be seen that, based on the weight of the finished chewing gum, the special paraffin wax is present in proportions of the order of about 0.3% to about 4% and, in the preferred embodiments of my invention, in proportions slightly above 1.0%.

In addition to the advantages emanating from my invention, as pointed out hereinabove, there are other important improvements which accrue. Thus, the addition of the special wax to jelutong and other similar chewing gum base materials produces, in the final or finished chewing gum, excellent cohesion, roundness, lift and life or springiness not attainable by means of the paraffin waxes heretofore employed. It produces a firmer chew and, in respect to smoothness, in which property Mexican chicle is outstandingly satisfactory and in which chicle substitutes are notably deficient, it imparts this property to jelutong and the like so that the resulting products are at least the equal of and, in many cases, are superior to Mexican chicle.

As I have indicated hereinabove, the special paraffin wax may be employed to improve markedly any of the usual chewing gum bases or mixtures thereof including, for example, in addition to those mentioned previously, balata, Leche Caspi, gutta percha, coumarone-indene resins, and the like, with or without Mexican chicle and with or without improving agents such as hydrogenated oils, mineral oils, beeswax, and other agents which are sometimes added to chewing gum mixes for obtaining special effects. The invention is of especial utility in the improvement of chewing gum bases of the jelutong or pontianak type, and the ester gum and coumarone resin types.

Wherever the term "chewing gum material" is employed herein and in the claims, it will be understood to cover the chewing gum bases as well as the finished chewing gum, unless the connotation otherwise expressly indicates.

While I have described my invention in detail, it will be understood that variations and modifications may be made without departing from the spirit thereof, as exemplified by the appended claims.

What I claim as new and desire to protect by Letters Patent of the United States is:

1. A chewing gum material including a paraffin wax having a melting point of at least 160 degrees F.

2. A chewing gum base including a paraffin wax having a melting point of at least 160 degrees F.

3. Chewing gum containing a paraffin wax having a melting point of at least 160 degrees F.

4. A chewing gum base including a gutta constituent and a paraffin wax having a melting point of from about 160 degrees F. to about 180 degrees F.

5. Chewing gum containing jelutong and a paraffin wax having a melting point of from about 160 degrees F. to about 180 degrees F.

6. A chewing gum base containing jelutong and a paraffin wax having a melting point of from about 160 degrees F. to about 180 degrees F., the paraffin comprising approximately 2% to 15%, by weight, of said chewing gum base.

7. Chewing gum containing chicle, jelutong, and a paraffin wax having a melting point of from about 160 degrees F. to about 180 degrees F.

8. Chewing gum containing from about 0.3% to about 4.0%, by weight, of a paraffin wax having a melting point of from about 160 degrees F. to about 180 degrees F.

9. A chewing gum base containing a gutta constituent and a paraffin wax having a melting point of at least 160 degrees F., the paraffin comprising approximately 5% to 8%, by weight, of said chewing gum base.

10. Chewing gum containing jelutong and approximately 1.0%, based on the weight of said chewing gum, of a paraffin wax having a melting point of from about 160 degrees F. to 180 degrees F.

11. A chewing gum base including a major proportion of a chicle substitute and a minor proportion of a paraffin wax having a melting point of from about 160 degrees F. to about 180 degrees F.

12. A chewing gum base including a paraffin wax having a melting point of approximately 168 degrees F. to approximately 180 degrees F.

13. Chewing gum including jelutong and a paraffin wax having a melting point of approximately 168 degrees F. to approximately 180 degrees F.

ROBERT L. WILSON.